United States Patent Office 3,790,563
Patented Feb. 5, 1974

3,790,563
TETRAHYDRO DIAZEPINONES AND THEIR PREPARATION FROM HYDRAZINES AND δ-CARBONYLACIDS
Camille Georges Wermuth, Strasbourg, and Jean Cahn, Paris, France, assignors to Synthelabo, Paris, France
No Drawing. Filed Dec. 16, 1971, Ser. No. 208,957
Claims priority, application France, Dec. 16, 1970, 7045361
Int. Cl. C07d 53/02
U.S. Cl. 260—239.3 R                       8 Claims

ABSTRACT OF THE DISCLOSURE

A hydrazine is reacted with a δ-carbonyl acid to provide 2,3,5,6-tetrahydro-4H-1,2-diazepine - 3 - ones of the formula

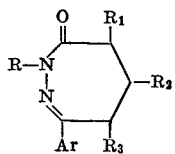

wherein

Ar is phenyl, tolyl, halophenyl, methoxyphenyl, naphthyl, or thienyl,
R is hydrogen, lower alkyl, carboxy(lower alkyl), di(lower alkyl)amino(lower alkyl), morpholino(lower alkyl) or pyrrolidino(lower alkyl), and each of $R_1$, $R_2$ and $R_3$ is independently hydrogen, lower alkyl, or a phenyl group, and the pharmaceutically acceptable salts and quaternary ammonium derivatives thereof.

The compounds are useful in pharmaceutical chemistry, having been found particularly useful as psychotropic agents.

BACKGROUND OF THE INVENTION

In the class of polyhydro-1,2-diazepine-3-ones has heretofore been described, as far as the applications know, only 1,2,3,5,6,7-hexahydro-4H-1,2-diazepine - 3 - one (S. Huenig and collaborators, Rev. Chim. Acad. Rep. Popul. Roumaine, 1962, 7, 935); this compound was prepared by transposition of a diazepinol in acid medium.

SUMMARY OF THE INVENTION

The present invention provides new compounds of the class of polyhydro-1,2-diazepine - 3 - ones, to wit 2,3,5,6-tetrahydro-4H-1,2-diazepine-3-ones.

The present invention also aims to provide novel therapeutic agents particularly new compounds having psychotropic action.

According to the present invention are provided 2,3,5, 6-tetrahydro-4H-1,2-diazepine - 3 - ones bearing a carbocyclic or heterocyclic substituent in position 7. It concerns more particularly those which bear an aromatic mono- or poly-nuclear substituent in the 7 position.

Typical compounds are those which correspond to the general formula

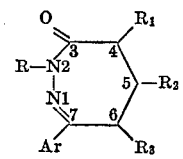

in which

Ar is phenyl, halogeno phenyl, methoxy phenyl, naphthyl or thienyl,
R is hydrogen or a low aralkyl radical which optionally may carry an acid group or a secondary or tertiary amino group optionally salified or quaternized, and
$R_1$, $R_2$ and $R_3$ each represent a hydrogen atom, a lower alkyl radical or an aryl radical, optionally substituted, as well as the salts and quaternary ammonium compounds of compounds which are basic.

DETAILED DESCRIPTION OF THE INVENTION

The present invention provides particularly the following derivatives of 2,3,5,6-tetrahydro-4H-1,2-diazepine-3-one:

the 2-(2-morpholino-ethyl)-7-phenyl derivative,
the 2-methyl-7-phenyl derivative,
the 2-(3-dimethylamino-propyl)-7-phenyl derivative,
the 2-(2-pyrrolidino-ethyl)-7-phenyl derivative,
the 2-(2-pyrrolidino-ethyl)-7-parachloro-phenyl derivative,
the 2-(2-morpholino-ethyl)-7-parachloro-phenyl derivative,
the 2-methyl-7-parachloro-phenyl derivative,
the 2,5-dimethyl-7-phenyl derivative,
the 6-methyl-2-(2-morpholinoethyl)-7-phenyl derivative,
the 2,6-dimethyl-7-phenyl derivative,
the 2-(2-morpholinoethyl) 4,7-diphenyl derivative,
the 2-methyl-7-β-naphthyl derivative,
the 2-methyl-7-α-naphthyl derivative,
the 2-methyl-7-paramethoxy phenyl derivative,
the 2-methyl-7-α-thienyl derivative,
the 2-methyl-6,7-diphenyl derivative,
the 2-methyl-7-orothotolyl derivative,
the 2-methyl-7-metatolyl derivative,
the 7-phenyl derivative, and
the 2-carboxymethyl-7-phenyl derivative and the salts and quaternary ammonium derivatives of those which are basic.

According to the invention the novel compounds may be prepared by reacting a hydrazine, particularly a hydrazine corresponding to the formula $H_2N$—$NH$—$R$ with a δ-carbonyl acid which moreover bears in the δ position, a carbocyclic or heterocyclic substituent, particularly an acid corresponding to the formula

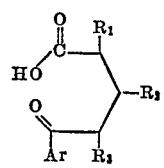

wherein the symbols, R, $R_1$, $R_2$, $R_3$ and Ar have the meanings given above.

The reaction is preferably carried out in an anhydrous inert organic diluent; it is advantageous to use a benzene hydrocarbon so that the system gives an azeotropic mixture with water produced by the condensation, the reaction being carried out at the boiling temperature. It can advantageously be used as an apparatus which continuously entrains the water such as a Dean and Stark separator.

It should be observed that the best yields of the condensation products are obtained when there is about 20 times more diluent than reactants by weight.

The preparation will be illustrated by Examples 1–22 which are however not limitative and in which there is indicated, as well as the mode of preparation, the code number, the chemical name and the essential constants of each of the compounds prepared. The temperatures are given in degrees centigrade.

EXAMPLE 1

2-(2-morpholinoethyl) - 7 - phenyl - 2,3,5,6 - tetrahydro-4H-1,2-diazepine-3-one and its acid maleate (LD–W 601–69)

A solution of 19.2 g. (0.1 mol) of γ-benzoyl-butanoic acid is heated to reflux in 500 ml. xylene and there is then added dropwise, by means of a dropping funnel 14.5 g. (0.1 mol) of (2-morpholinoethyl) hydrazine, and the mixture is kept under reflux for 6 hours after the end of the addition.

The reflux condenser is then replaced by a continuous water separator, for example of the Dean and Stark type, and a further reflux is carried out, with separation of the water formed, for 12 hours.

The solvent is then evaporated, the residue taken up in chloroform and washed successively with water, an aqueous potassium bicarbonate solution (10%) and then again with water. The chloroform phase, after drying over anhydrous magnesium sulphate, filtration and evaporation leaves a brown oily liquid which can be purified by distillation ($E_{0.5}$=200–210°). There is thus obtained 18 g. (60% of theoretical yield) of 2-(2-morpholinoethyl)-7-phenyl-2,3,5,6-tetrahydro - 4H - 1,2 - diazepine - 3 - one (LD–W 601–69-base).

This base is dissolved in a minimum of anhydrous tetrahydrofuran (THF) and treated with maleic acid in an equimolecular quantity, likewise dissolved in a minimum of anhydrous THF.

The maleate precipitates by addition of anhydrous ether. It is filtered and recrystallized from ethanol, optionally in the presence of active charcoal.

17.5 g. (70%) of acid maleate are obtained in the form of slightly beige crystals, soluble in water and melting at 140°.

EXAMPLE 2

2-methyl-7-phenyl-2,3,5,6-tetrahydro-4H-1,2-diazepine-3-one (LD–W 602–70)

By operating as in Example 1, from 28.5 g. (0.15 mol) of γ-benzoyl butanoic acid and 6.9 g. (0.15 mol) of methyl hydrazine there is obtained a crystalline solid after evaporation of the chloroformic solvent. Distillation under reduced pressure is therefore not necessary. This solid is purified by treatment with active charcoal (dissolution in 95 percent ethyl alcohol, addition of charcoal, filtration and then evaporation of the solvent) and it is then recrystallized from hexane. 16 g. (53%) of white crystals are collected, slightly soluble in water and melting at 83°.

EXAMPLES 3–22

By operating as in Example 1 or 2 may be obtained the compounds which are identified in the following table.

TABLE

| Ex. No. | Code No. | Preparation according to Example | Ar | R | $R_1$ | $R_2$ | $R_3$ | M.P. or B.P./mm. Hg solubility in water color | Yield, percent | Salt M.P. or B.P./mm. Hg solubility in water color | Yield, percent |
|---|---|---|---|---|---|---|---|---|---|---|---|
| 3 | 603 | 1 | phenyl | —$CH_2$—$CH_2$—$CH_2$—$N(CH_3)_2$ | H | H | H | 170–175°/0.03 | 51 | Acid maleate, 131° | |
| 4 | 604 | 1 | phenyl | —$CH_2$—$CH_2$—N(morpholino) | id. | id. | id. | 205–210°/0.005 | 70 | Acid maleate, 146°, soluble white | 64 |
| 5 | 605 | 1 | 4-Cl-phenyl | id. | id. | id. | id. | 195–200°/0.5 | 76 | Acid maleate, 178°, soluble, white | 68 |
| 6 | 606 | 1 | phenyl | —$CH_2$—$CH_2$—N(morpholino) | id. | id. | id. | 215°/0.1 | 75 | Acid maleate, 165°, soluble, white | |
| 7 | 1606 | 1 | id. | id. | id. | id. | id. | id. | 75 | Hydrochloride, 174°, cream | 78 |
| 8 | 620 | 1 | id. | id. | id. | id. | id. | id. | 75 | Iodomethylate, 162°, cream | 42 |
| 9 | 607 | 2 | id. | $CH_3$ | id. | id. | id. | 85%, insoluble, white | 64 | | |
| 10 | 608 | 2 | phenyl | —$CH_3$ | H | id. | id. | 135–140°/0.5, 69°, insoluble, white | 75 | | |
| 11 | 609 | 1 | id. | —$CH_2$—$CH_2$—N(morpholino) | id. | id. | $CH_3$ | 178/0.1 | 73 | Acid, maleate, 168°, soluble, rose | 61 |

See footnote at end of table.

TABLE—Continued

| Ex. No. | Code No. | Preparation according to Example | Ar | R | R₁ | R₂ | R₃ | M.P. or B.P./mm. Hg solubility in water color | Yield, percent | Salt M.P. or B.P./mm. Hg solubility in water color | Yield, percent |
|---|---|---|---|---|---|---|---|---|---|---|---|
| 12 | 610 | 2 | id. | —CH₃ | id. | id. | id. | 160–165°/1.5, 70°, insoluble, white | 65 | | |
| 13¹ | 611 | 1 |  | —CH₂—CH₂—N |  | id. | id. | 190–195°/1.5 | 74 | Acid maleate, 174°, soluble rose | 83 |
| 14 | 612 | 2 |  | —CH₃ | H | H | H | 102°, insoluble, yellowish | 74 | | |
| 15 | 613 | 2 | id. | id. | id. | id. | id. | 90°, insoluble, yellowish | 60 | | |
| 16 | 614 | 2 |  | id. | id. | id. | id. | 94°, insoluble, yellowish | 68 | | |
| 17 | 615 | 2 |  | id. | id. | id. | id. | 108°, insoluble, yellow | 76 | | |
| 18 | 616 | 2 |  | id. | id. | id. | id. | 85°, insoluble, white | 40 | | |
| 19 | 617 | 2 |  | id. | id. | id. |  | 170–175°/1, non-miscible, light yellow | 62 | | |
| 20 | 618 | 2 |  | id. | id. | id. | H | 165°/1, non-miscible, colorless | 66 | | |
| 21 | 619 | 2 |  | H | id. | H | id. | 158° (Kofler), slightly insoluble white | 32 | | |
| 22 | 621 | (²) |  | —CH₂—COOH | id. | id. | id. | 152° | 76 | | |

¹ Bis.   ² See below.

The iodomethylate of Example 8 was prepared from the base (20 g.) and methyl iodide (25 g.) in acetone (100 ml.), with final addition of anhydrous ether to precipitate the quaternary compound and the hydrochloride was prepared from the base and hydrogen chloride in anhydrous ether.

To prepare the compound of Example 22, ethyl hydrazinoacetate was condensed with γ-benzoyl butyric acid and then the ester obtained was saponified in the following way:

(a) Ethyl hydrazino-acetate being very instable, the base is set free from its hydrochloride just before use. The hydrochloride is put into suspension in chloroform and the stoichiometric quantity of 33% NH₄OH added.

The mixture obtained is filtered to eliminate NH₄Cl and the chloroformic solution, after decantation, is dried over magnesium sulphate. After evaporation of the chloroform the hydrazine is used as such.

(b) By operating as in Example 1, from 19.2 g. (0.1 mol) of γ-benzoyl butanoic acid and 11.9 g. (0.1 mol) of ethyl hydrazino acetate, there is obtained after distillation 14.8 g. (54%) diazepinone. (E₀.₃=170°.)

(c) 14 g. (0.051 mol) of the ester are dissolved in 50 ml. of methanol and 4.1 g. (0.102 mole) of NaOH dissolved in 100 ml. of methanol are added. The mixture is refluxed for 20 minutes and the solution then treated with charcoal after which it is evaporated to dryness.

The residue is taken up with a little water and is acidified clearly with 10 $NH_2SO_4$. The filtered acid is taken up in a boiling potassium bicarbonate aqueous solution.

The mixture is filtered to eliminate insoluble impurities, cooled and reacidified. After recrystallization in benzene 9.4 g. of acid are obtained i.e. a yield of 76%. Instantaneous melting point=152°.

The δ-carbonyl acids necessary for the synthesis of the 1,2-diazepine-3-ones defined in the preceding examples are in part known and described in the literature; others are prepared by application of known methods.

(1) γ-benzoyl butanoic acid: Prepared according to E. C. Taylor and A. McKiccop, J. Amer. Chem. Soc., 1967, 87, 1984.

(2) γ-(parachlorobenzoyl) butanoic acid: Prepared from glutaric anhydride and chlorobenzene by analogy with E. N. Goldschmidt, C.A., 1965, 63, 1740e. White crystals recrystallizable from a mixture of ethyl-acetate and hexane; melting point=106°.

(3) γ-(p-methoxybenzoyl) butanoic acid: Prepared according to W. S. Johnson, A. R. Jones and W. P. Schneider, J. Amer. Chem. Soc., 1950, 72, 2395.

(4) γ-(o-methylbenzoyl)-butanoic acid: Prepared from 2-bromotoluene and 4-carbethoxy butyric acid chloride by analogy with J. Cason, Chem. Rev., 1947, 40, 15. White crystals recrystallizable in a mixture of ethyl acetate and hexane; melting point=72°.

(5) γ-(m-methylbenzoyl)-butanoic acid: Prepared as (4) above from 3-bromo toluene and 4-carbethoxy butyric acid chloride. White crystals recrystallizable from a mixture of ethyl acetate and hexane; melting point=114°.

(6) β-methyl-γ-benzoyl butanoic acid: Prepared according to K. Sato and O. Miyamoto, J. Chem. Soc. Japan, 1954, 75, 225.

(7) γ-benzoyl pentanoic acid: Prepared according to R. Bertocchio and J. Dreux, Bull. Soc. Chim., 1962, 823 and 1809.

(8) α-phenyl-γ-benzoyl butanoic acid: Prepared from ethylbenzoyl acetate and α-cyanostyrene by analogy with A. Vigier and J. Dreux, Bull. Soc. Chim., 1963, 677 and 1817. White crystals, recrystallizable in benzene; melting point =142°.

(9) γ-phenyl-γ-benzoyl butanoic acid: Prepared according to A. D. Campbell and I. D. R. Stevens, J. Chem. Soc., 1956, 959.

(10) γ-(β-naphthoyl) butanoic acid: Prepared according to R. Legros and D. Cagniant, C.R. Acad. Sci., 1960, 251, 553.

(11) γ-(α-naphthoyl) butanoic acid: Prepared as in (10).

(12) γ-(α-thenoyl) butanoic acid: Prepared according to P. Gagniant and A Deluzarche, C.R. Acad. Sci., 1946, 222, 1301.

The compounds of the preceding examples were subjected to the classical tests for determining the modification which they provoke in the psychomotor behaviour of mice subjected to their influence.

The principle of these tests is the following:

Any mouse placed for the first time in a new environment shows very lively motor activity with a view to exploring the place where it is: the kinetic study of the motor activity shows that said activity is maximum in the first 5 minutes and then decreases in a notable way so that between 5 and 15 minutes (i.e. in 10 minutes) the activity is the same as that in the first 5 minutes.

The activity is a function of the surface to be explored. It is also a function of two contradictory motivations: curiosity and fear. When the surface offered permits a "horizontal" activity (walking) the curiosity appears to outweigh; on the other hand, when the surface is reduced and leads to "vertical" activity (standing along the walls of a cylinder it seems that anxious fear is predominant and leads to an activity diminished or displayed for periods and apparently without focalization).

This state of anxiety is confirmed by the presence of defecation and urination which can be classed as emotional reactions by analogy with the observations of Taeschler in the "Skinner box."

As to medullary reflectivity, this is determined by the traction test according to Courvoisier: normally a mouse suspended by its two front paws on a wire stretched horizontally brings its two rear paws or at least one of them onto the wire in less than 5 seconds and tries to heave itself up. This test is codified here by 2 (heaving up and equilibration in less than 5 seconds) to 1 (heaving up without equilibration i.e. a traction is effected but without taking equilibrium) and 0 (no attempt at traction).

The rotating rod test allows the muscular tonus and motor coordination of the mice to be judged when they are placed on a rod turning at constant speed.

Finally analgesia is determined by the variations in reaction time (licking of front paws) of mice placed on a plate heated to 56° (Eddy's test).

After having determined in precise or approximate way the dose, orally administered, which causes the death of half of the treated mice (LD 50) in 7 days, the following doses were calculated for each compound according to J. T. Litchfield and F. Wilcoxon (J. Pharm. Exp. Ther., 1949, 96, 99–113).

(1) 50% sedative dose of non-anxiogenic exploration (DSEh 50).—This is the dose which, in the first 5 minutes diminishes the motor activity in a rectangular enclosure of interior surface 360 sq. cm. (length 24 cm.; width 15 cm.; height 9.5 cm.) in 50% of the mice; two infra-red beams of light perpendicular to one another (medians of the enclosure) fall on two photoelectric cells connected to an impuse counter which is operated at each time that the animal cuts one of the beams.

(2) 50% sedative dose of non-anxiogenic basal activity (DSBh 50).—This is the dose at which in the same enclosure the activity between 5 and 15 minutes is diminished in 50% of the mice.

(3) 50% sedative dose of anxiogenic exploration (DSEv 50).—This is the dose which in 50% of the mice diminishes the standing activity counted by the experimenter in the course of the first minute after having placed the mice in a glass cylinder of 63.6 sq. cm. surface (height 30 cm., diameter 9 cm.).

(4) 50% sedative dose of basal anxiogenic activity (DSBv 50).—This is the dose which, in the same enclosure, diminishes the activity between 1 and 3 minutes in 50% of the mice.

(5) 50% inhibiting dose having regard to an emotional manifestation (DI 50).—This is the dose which suppresses defecation or urination during the 3 minutes passed in the cylindrical enclosure in 50% of the mice.

(6) 50% relaxant muscular dose (DR 50).—This is the dose which provokes in less than 3 minutes the fall of 50% of the mice placed on a rod of scraped wood turning at a speed of 16 revolutions per minute (diameter of the rod 1.7 cm.).

In order to effect the 6 calculations above, the following criteria established from 100 control mice, i.e. mice which have received orally only a 10% aqueous solution of Senegal gum in a dose of 20 ml./kg., were used.

The non-anxiogenic exploration is considered as diminished when the number of impulses is less than 51 (i.e. a diminution of 35% with reference to the average number for the control group) and the basal non-anxiogenic activity should be reduced to 50% with reference to that of the control group (i.e. individual number of impulses less than 32).

The exploration in an anxiogenic medium is said to be diminished when the number of heavings up of the mouse is less than 7 (diminution of 30% with reference to the control mice) while it should be less than 4 for the basal activity in anxiogenic medium to be regarded as diminished (i.e. a diminution of 50% with reference to the control mice).

On the other hand, an average index represents the performances of one lot of mice during the traction test. It is only when this average index is less than 1 that a number of mice of this lot have lost their redressing reflex.

Finally in the heated Eddy plate test, any mice was considered as hyperalgic which had a reaction time less than 6 seconds and as under analgesia if the reaction time was greater than 13 seconds; these times represent a variation of 35% on the average value obtained with the controls.

All compounds were administered orally in a 10% aqueous solution of Senegal gum in a volume of 20 ml./kg. (all the doses are expressed in mg./kg.).

The changes in psychomotor behaviour of the mice are always undertaken 30 minutes after this oral administration; in certain cases complementary studies at the ends of other times are carried out on other lots of mice in order to appreciate the duration of the effects.

The lethality was noted during the 7 days following ingestion.

The results are tabulated in the following table.

at this dose the muscular hypotonia is notable and may lead to fear that there is an interference in spite of the absence of incoordination.

The approximate LD 50 being of the order of 875 mg./kg. (intragastric route) and the deaths arising in the course of the first 24 hours after treatment, the therapeutic index is about 10 or about 7 depending upon whether one considers the psychomotor behaviour or the motor reaction to a painful stimulus.

In conclusion, Compound 605 possesses properties which place it in the class of anxiolytics (therapeutic index 10). Further it exerts a thermo-analgesic effect (therapeutic index 7) which marks it out in the class of benzodiazepines.

Compound 607.—Whatever the type of enclosure the basal motor activity is diminished at a dose twice as weak as for exploration activity; if this difference is statistically significant only in an anxiogenic medium, this is due to the better dose/effect relationship in this case. The type of enclosure does not influence the effects of 607 on the exploration activity.

The emotional inhibiting dose is twice as weak as the dose reducing the exploratory activity and 1.8 times less

TABLE

| Number | LD 50 | 50% sedative dose | | | | 50% inhibiting dose with respect to emotional manifestations | 50% muscular relaxant dose |
|---|---|---|---|---|---|---|---|
| | | Non-anxiogenic exploration | Non-anxiogenic basal activity | Anxiogenic exploration | Anxiogenic basal activity | | |
| 619 | | | | | | | |
| 602 | C.875 | 220.0 / 142.0-340.0 | 158 / 82.5-303 | 240 / 161-356 | 160 / 104-246 | | C.190. |
| 604 | C.1,250 | C.850 | | C.1,400 | C.450 | | C.800. |
| 601 | 2,350 / 2,157-2,559 | 115.0 / 61.0-218.0 | 260.0 / 95.0-710.0 | 53.0 / 30.9-90.7 | 45.0 / 19.6-103.4 | 17.5 / 3.45-88.8 | 85. / 51.4-140.6. |
| 603 | C.1,750 | C.625 | | C.200 | C.225 | | 210.0 / 128-345. |
| 607 | C.750 | 127 / 66-245 | 65 / 46-93 | 125 / 83-188 | 65 / 48-87 | 62.5 / 43.2-90.5 | 110. / 74.8-161.7. |
| 605 | C.875 | 130 / 89-189 | 56 / 38.0-82.6 | 87.5 / 59-130 | 83 / 63-110 | 81 / 50-132 | C.240. |
| 606 | C.875 | C.115 | | | | C.290 | C.200. |
| 618 | C.1,800 | 210.0 / 162.8-268.8 | 220.0 / 170.5-284.7 | 320.0 / 256.8-398.7 | 350.0 / 269.0-455.4 | 245.0 / 169.8-353.5 | C.430. |
| 614 | C.2,000 | 160.0 / 101.0-253.0 | 120.0 / 76.0-190.0 | 330.0 / 205.0-531.0 | 250.0 / 154.0-405.0 | 215.0 / 127.0-364.0 | |
| 615 | C.550 | 72.5 / 36.2-155.0 | 44.0 / 21.8-88.5 | C.400 | 170.0 / 98.0-296.0 | C.110 | C.190. |
| 613 | C.2,400 | 250.0 / 163.0-383.5 | 270.0 / 175.7-415.0 | 450.0 / 315.3-612.2 | C.850 | 550.0 / 346.1-874.0 | C.625. |
| 612 | C.2,000 | 300.0 / 215.7-417.3 | 400.0 / 278.9-573.6 | C.1,700 | C.825 | 400.0 / 275.3-581.2 | 320 / 168.0-609.6. |
| 611 | C.1,150 | 140.0 / 89.1-219.9 | 110.0 / 75.9-159.4 | 180.0 / 121.4-266.9 | 240.0 / 157.7-365.3 | 180.0 / 115.6-280.3 | 160.0 / 89.0-287.7. |
| 608 | C.1,400 | 136.6 / 92.2-202.5 | 138.0 / 94.9-224.3 | 225.0 / 134.7-375.8 | 310.0 / 202.2-475.3 | 230 / 153.1-345.5 | 180. / 123.1-263.2. |
| 610 | C.800 | 98.0 / 78.7-122.1 | 52.5 / 43.6-63.1 | C.120 | C.290 | C.200 | C.450 |
| 609 | C.850 | 120.0 / 75.1-191.8 | 82.5 / 48.0-136.0 | 250.0 / 158.1-395.3 | 265.0 / 140.0-500.8 | 165.0 / 99.6-273.4 | C.310. |
| 600 | C.3,000 | 380.0 / 250.0-576.0 | C.160.0 | C.825.0 | C.450 | | C.450 |

There will now be given in further detail the properties of three typical compounds, Compounds 605, 607 and 601.

Compound 605.—In a neutral enclosure it influences basal motor activity about 2.5 times more than exploratory activity, but in an anxiogenic enclosure it is not the same and the two 50% active doses match. The exploratory activity undergoes the same lowering whatever the enclosure and at this dose the emotional manifestations are suppressed. These effects on the psychomotor behaviour are not accompanied by disturbances in medullary reflectivity or in motor coordination, despite a muscular hypotonia very sensitive to prehension; these observations neatly separate Compound 605 from the derivatives of benzodiazepine. Another notable difference concerns the Eddy test since an increase in the reaction time is observed proportional to the dosage between 31 and 250 mg./kg.; the 50% analgesic dose of 605 is in effect equal to 126 mg./kg. (confidence limits for P=0.05: 86 and 186) with regard to the thermo-algic stimulus, which effectively allows of laying stress on a difference with benzodiazepine derivatives but does not permit it to be concluded that there is a true analgesic potentiality since great than the dose acting on the motor coordination. It follows that there is no difference between the dose acting on the exploration activity and the dose inducing motor incoordination.

It thus appears that 607 acts essentially on the emotional reactions; the approximate LD 50 being about 750 mg./kg. (death in the course of the first 24 hours) the therapeutic index is equal to about 12.

Medullary reflectivity is present, even at 250 mg./kg. The reaction time on thermal stimulus is modified only for this substantial dose which interferes with motor coordination; it is a lengthening which differentiates 607 from the benzodiazepine derivatives and which makes it nearer compounds like thioridazine.

In conclusion, the compound has the properties which reminds one both of thioridazine and chlordiazepoxide.

Compound 601.—Whatever the enclosure it was observed that the exploratory activity is diminished for a dose weaker than for the basal motor activity, this effects appearing more clearly in a neutral enclosure than in an anxiogenic enclosure; however statistical comparison teaches that at a probability level of 5% there exists no difference between the 50% active doses with regard to these two motor parameters, this being true for each enclosure considered separately. If one compares the effects observed at a function to the type of enclosure, one cannot affirm that 601 is more active in an anxiogenic enclosure. However the anxiolytic properties are certain: the dose which inhibits emotional manifestations in an anxiogenic enclosure is respectively 3 and 5 times weaker than those which diminish the exploration or the motor coordination.

The LD 50% being equal to 2350 mg./kg., the therapeutic index for anti-emotional action is of the order of 130.

Medullary reflectivity is not reached, even for 500 mg./kg. 601 does not appear to influence the thermic sensibility; nevertheless, for the two strongest doses the reaction time is increased in a few animals.

The examination of the results obtained as a function of the previous treatment time for a dose of 15.6 mg./kg. shows that the muscular relaxant effect is not modified between 30 minutes and 4 hours while the global sedative effect diminishes regularly (the anti-emotional action has not been researched).

Finally, the anti-emotional action of Compound 601 with a therapeutic index equal to 130, i.e. of the order of those of chlordiazepoxide and diazepam, underlines the fact that it is a particularly active derivative of this series.

The compounds of the present invention are, in consideration of the foregoing, usable as active ingredients for psychotropic medicaments in human and veterinary medicine and the present invention includes medicaments effective amounts of the same.

They may be formulated in particular for oral administration for example as gelules or tablets which contain 10 mg. of a tetrahydrodiazepinone according to this invention, for endorectal administration (10 mg. suppositories) or for parenteral (intramuscular or intraveneous) administration for example in ampoules containing 10 mg. thereof.

We claim:

1. A compound of the formula

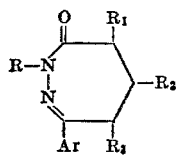

wherein
Ar is phenyl, tolyl, halophenyl, methoxyphenyl, naphthyl, or thienyl,
R is hydrogen, lower alkyl, carboxy(lower alkyl), di-lower alkyl)amino(lower alkyl), morpholino(lower alkyl) or pyrrolidino(lower alkyl),
and each of $R_1$, $R_2$ and $R_3$ is independently hydrogen, lower alkyl, or a phenyl group,
and the pharmaceutically acceptable salts and quaternary ammonium derivatives thereof.

2. A compound of claim 1 wherein said pharmaceutically acceptable salts and quaternary ammonium derivatives thereof are selected from the group consisting of the hydrochlorides, acid maleates and iodomethylates of said compound.

3. A compound according to claim 1 wherein
Ar is phenyl, o- or m-tolyl, p-chlorophenyl, p-methoxyphenyl, α- or β-naphthyl or 2-thienyl,
R is hydrogen, methyl, carboxymethyl, 3(dimethylamino)-propyl, 2-morpholino-ethyl or 2-pyrrolidino-ethyl, and
each of $R_1$, $R_2$ and $R_3$ is independently hydrogen, methyl or phenyl.

4. A compound selected from the class consisting of 2-(2-morpholino-ethyl)-7-phenyl-2,3,5,6-tetrahydro - 4H-diazepine-3-one and the acid maleate thereof.

5. A compound selected from the class consisting of 2-(2-pyrrolidino-ethyl) - 7 - parachlorophenyl - 2,3,5,6-tetrahydro-4H-diazepine - 3 - one and the acid maleate thereof.

6. 2-methyl-7-parachlorophenyl - 2,3,5,6 - tetrahydro-4H-diazepine-3-one.

7. A process for the preparation of a compound according to claim 1, which process comprises the reaction of equimolar proportions of a hydrazine of the formula

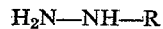

and a δ-carbonyl acid of the formula

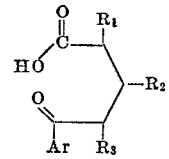

wherein Ar, R, $R_1$, $R_2$ and $R_3$ are defined as in claim 1, said reaction being carried out in an anhydrous inert organic diluent at the boiling temperature.

8. A process according to claim 7, wherein the inert organic diluent is a benzene hydrocarbon used in the proportion of about 20 parts in weight of the reactants.

References Cited

Chemical Abstracts, vol. 71, p. 317 (1969) (abstracting Franck-Neumann et al., in, Tetrahedron Letters (1969), vol. 14, pp. 1063–5).

HENRY R. JILES, Primary Examiner

R. T. BOND, Assistant Examiner

U.S. Cl. X.R.

260—483, 569, 247.5 R, 518 R, 326.86, 332.2 A; 424—244, 274, 248, 275